United States Patent
Inoue

(10) Patent No.: US 9,404,763 B2
(45) Date of Patent: Aug. 2, 2016

(54) DEPARTURE/DESTINATION LOCATION EXTRACTION APPARATUS AND DEPARTURE/DESTINATION LOCATION EXTRACTION METHOD

(71) Applicant: TOYOTA JIDOSHA KABUSHIKI KAISHA, Toyota-shi, Aichi-ken (JP)

(72) Inventor: Atsushi Inoue, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/746,389

(22) Filed: Jun. 22, 2015

(65) Prior Publication Data
US 2016/0033291 A1   Feb. 4, 2016

(30) Foreign Application Priority Data

Jul. 31, 2014   (JP) ................................ 2014-156944

(51) Int. Cl.
| | | |
|---|---|---|
| *G01C 21/00* | (2006.01) | |
| *G01C 21/36* | (2006.01) | |
| *G06Q 10/02* | (2012.01) | |
| *G08G 1/14* | (2006.01) | |

(52) U.S. Cl.
CPC ........ *G01C 21/3617* (2013.01); *G01C 21/3685* (2013.01); *G06Q 10/02* (2013.01); *G08G 1/148* (2013.01)

(58) Field of Classification Search
CPC ... G01C 21/005; G01C 21/26; G01C 21/3617
See application file for complete search history.

(56) References Cited

U.S. PATENT DOCUMENTS

| | | | | |
|---|---|---|---|---|
| 2008/0122607 | A1* | 5/2008 | Bradley | B60Q 1/0017 340/468 |
| 2009/0312946 | A1* | 12/2009 | Yoshioka | G08G 1/096877 701/532 |
| 2012/0310534 | A1* | 12/2012 | Mizuno | G01C 21/3617 701/540 |
| 2013/0158855 | A1 | 6/2013 | Weir et al. | |
| 2015/0254981 | A1* | 9/2015 | Tachibana | B60R 1/00 340/932.2 |

FOREIGN PATENT DOCUMENTS

| | | |
|---|---|---|
| JP | 2013-127461 A | 6/2013 |
| JP | 2013-142587 A | 7/2013 |

* cited by examiner

*Primary Examiner* — Thomas Tarcza
*Assistant Examiner* — Alex C Dunn
(74) *Attorney, Agent, or Firm* — Oliff PLC

(57) ABSTRACT

A departure/destination location extraction apparatus includes a travel history accumulation unit configured to store a travel history of a vehicle, including a plurality of parking positions of the vehicle; and a position extraction unit configured to extract, among the parking positions stored in the travel history accumulation unit, one or more pairs of the parking positions where a distance between the parking positions in each of the pairs of the parking positions is less than or equal to a predetermined first threshold, each of the pairs being treated as a set of candidate points, and to extract an area including the candidate points that would be connected as a whole if the parking positions in each of the sets were connected with each other, as at least one of a departure location and a destination location.

6 Claims, 5 Drawing Sheets

DEPARTURE/DESTINATION LOCATION EXTRACTION APPARATUS AND DEPARTURE/DESTINATION LOCATION EXTRACTION METHOD

FIELD

The disclosures herein generally relate to a technology that, when a vehicle having the same facility or the like as a departure location or a destination location, has parked at different places around the same facility, extracts the multiple different parking positions as the same departure location or destination location.

BACKGROUND

Conventionally, a navigation apparatus has been known that analyzes travel history of a vehicle in the past to estimate a destination location to which the vehicle is highly likely to head for from a current position (departure location), and makes a proposal about it to a user (driver) (see, for example, Patent Document 1).

Patent Document 1 discloses a navigation system that extracts one or more final destinations, which have frequently corresponded to a current starting position (departure location) (for example, destination locations that have been frequently headed for from the current departure location), and shows them on a display. This makes it possible for the driver to select a frequently headed-for destination location from the current departure location, without performing tiresome input operations, which is very convenient.

RELATED-ART DOCUMENTS

Patent Documents

[Patent Document 1] Japanese Laid-open Patent Publication No. 2013-127461

However, even when having the same facility as a departure location or a destination location, parking positions may be different from time to time if the parking lot is very large, or no parking lots are available in the facility and a neighboring coin-operated parking lot or the like needs to be used. In such a case, since a navigation apparatus usually determines a parking position of the vehicle as the departure location or the destination location, if the parking position is different, it is not extracted as the same departure location or destination location, and a proposal of a destination location based on the past frequency may not be effectively executed.

Also, even at a facility where the parking position is virtually the same position every time, depending on detection precision of the vehicle position by using the GPS, it may be recognized as a different parking position, and a proposal of a destination location described above may not be similarly effectively executed.

Thereupon, in view of the above, when extracting at least one of a departure location and a destination location of a vehicle, based on travel history of the vehicle, it is an object of at least one embodiment of the present invention to provide a departure/destination location extraction apparatus that can extract parking positions as the same departure location or destination location, even if the vehicle parks at one of different parking positions in the same departure location and destination location, or the vehicle is considered to park at one of the different parking positions due to a detection error of the vehicle position by using the GPS or the like.

SUMMARY

According to at least one embodiment of the present invention, a departure/destination location extraction apparatus includes a travel history accumulation unit configured to store travel history of a vehicle, including a plurality of parking positions of the vehicle; and a position extraction unit configured to extract, among the parking positions stored in the travel history accumulation unit, one or more pairs of the parking positions where a distance between the parking positions in each of the pairs of the parking positions is less than or equal to a predetermined first threshold, each of the pairs being treated as a set of candidate points, and to extract an area including the candidate points that would be connected as a whole if the parking positions in each of the sets were connected with each other, as at least one of a departure location and a destination location.

Also, according to another embodiment of the present invention, a departure/destination location extraction method includes a travel history accumulation step storing travel history of a vehicle, including a plurality of parking positions of the vehicle; and a position extraction step extracting, among the parking positions stored in the travel history accumulation step, one or more pairs of the parking positions where a distance between the parking positions in each of the pairs of the parking positions is less than or equal to a predetermined first threshold, each of the pairs being treated as a set of candidate points, and extracting an area including the candidate points that would be connected as a whole if the parking positions in each of the sets were connected with each other, as at least one of a departure location and a destination location.

According to at least one embodiment of the present invention, when extracting at least one of a departure location and a destination location of a vehicle, based on travel history of the vehicle, it is possible to provide a departure/destination location extraction apparatus that can extract parking positions as the same departure location or destination location, even if the vehicle parks at one of different parking positions in the same departure location and destination location, or the vehicle is considered to park at one of the different parking positions due to a detection error of the vehicle position by using the GPS or the like.

DESCRIPTION OF EMBODIMENTS

In the following, embodiments of the present invention will be described with reference to the drawings.

Figure 1:
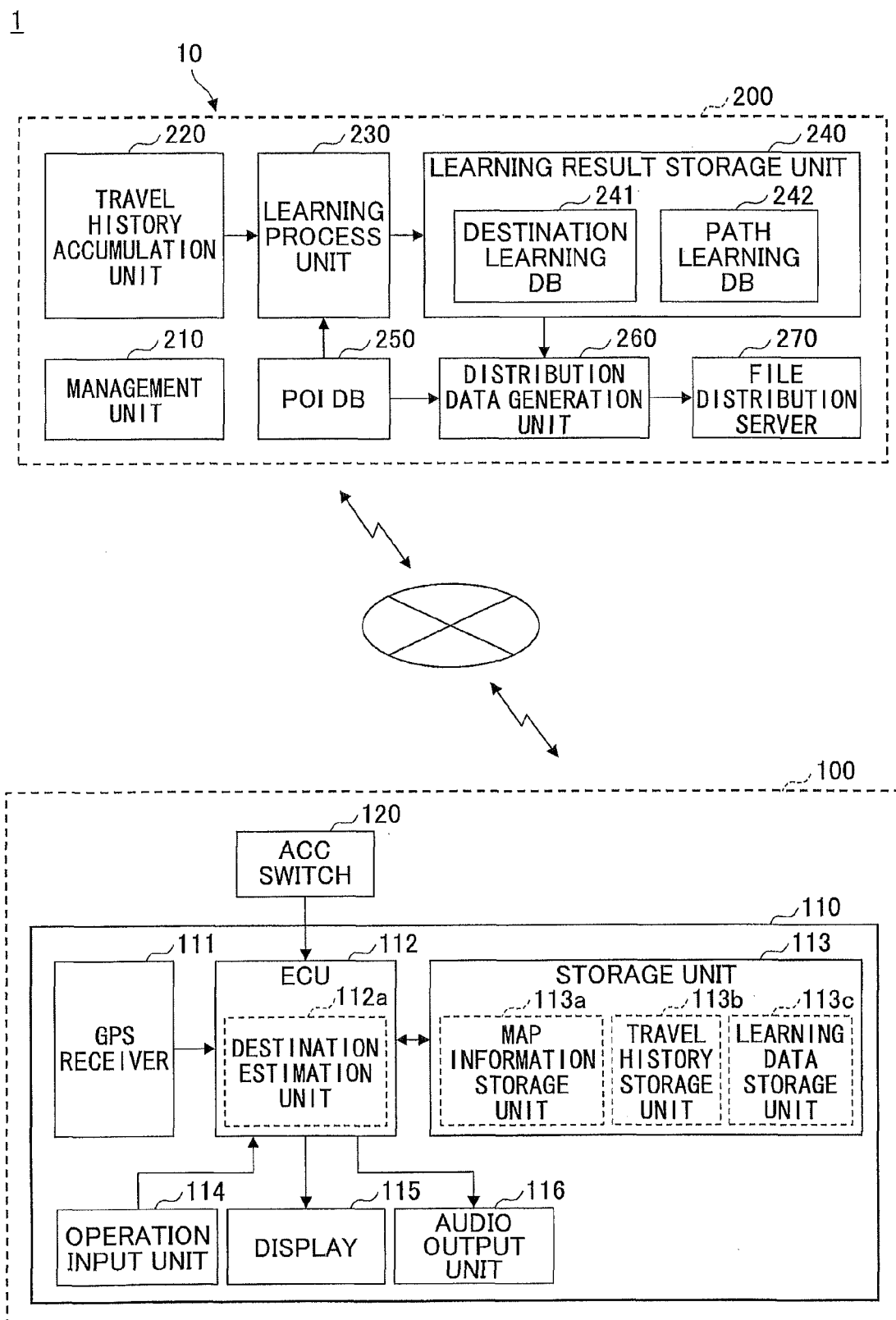
FIG. 1 is a block diagram illustrating an example of a configuration of a navigation system that includes a destination location extraction apparatus according to an embodiment of the present invention.

FIG. 1 is a block diagram illustrating an example of a configuration of a navigation system 1 that includes a destination location extraction apparatus 10 according to the present embodiment of the present invention.

The destination location extraction apparatus 10 in the present embodiment extracts (estimates) a departure location and a destination location of a vehicle 100 from parking positions of the vehicle 100, which will be described later. The destination location extraction apparatus 10 is implemented as a function of the navigation system 1, and is specifically configured to include a travel history accumulation unit 220, and a learning process unit 230, included in an information center 200, which will be described later.

The navigation system 1 is configured to include multiple vehicles 100, and the information center 200, and executes drive support and the like so that users (drivers) of the vehicles 100 reach their destination locations from current positions (departure locations or travel routes), respectively. In the following description, for the sake of simplicity, a relationship between one of the vehicles 100 and the information center 200 will be mainly described.

The vehicle 100 is configured to include an in-vehicle apparatus 110 that specifically executes drive support, based on information transmitted from the information center 200, and an ACC (accessory) switch 120.

The in-vehicle apparatus 110 is configured to be capable of bidirectionally communicating with the information center 200 via a wireless network, for example, a cellular phone network, and includes a GPS (Global Positioning System) receiver 111, an ECU 112, a storage unit 113, an operation input unit 114, a display 115, and an audio output unit 116. The GPS receiver 111 is a position detection unit that detects the position of the vehicle 100. The GPS receiver 111 calculates the position (longitude and latitude) of the vehicle 100, based on GPS signals received from several (for example, four) GPS satellites above the air, and transmits the position to the ECU 112.

The ECU 112 is a principal control unit in the in-vehicle apparatus 110, and is configured with, for example, a microcomputer and the like. The ECU 112 may execute various control processes by executing a program stored in a ROM on a CPU. For example, the ECU 112 executes a process to display on the screen of the display 115, a map around a current position of the vehicle 100 calculated by using the GPS receiver 111, based on map information stored in the map information storage unit 113a, which will be described later. Next, based on the map information stored in the map information storage unit 113a, the ECU 112 executes a path search process to a destination location input (selected) on the operation input unit 114 by the user (driver), and then, executes a path guidance process while traveling to the destination location.

Also, the ECU 112 functions as a destination estimation unit 112a, by executing a predetermined program on the CPU.

The destination estimation unit 112a executes a process to estimate a destination location that the vehicle 100 is heading for, based on learning data based on travel history of the vehicle 100 in the past stored in the learning data storage unit 113c, which will described later. As will be described later, the learning data storage unit 113c stores, as learning data, destination location learning information and path learning information, based on the travel history of the vehicle 100 in the past.

The destination location learning information is information that is obtained by extracting departure locations and destination locations of respective trips from the travel history of the vehicle 100, and arranging the number of trips, travel hours, travel paths (collection of links), and the like, for each of the same departure locations and destination locations.

Note that a "trip" means a travel course taken by the vehicle 100 that starts at a parking position and parks at a next parking position. In the present embodiment, it is a travel course after having the ACC switch 120 turned on (ACC-ON), until the ACC switch 120 is turned off (ACC-OFF).

The path learning information includes information about probability values where a probability value represents a likelihood that the vehicle 100 proceeds from a link to a next link that is highly likely to be taken, based on the travel history of the vehicle 100. For example, a relationship (probability value) between a link (source link) on which the vehicle 100 is traveling, and a next link to be taken (destination link) may be stored in a sparse matrix format, which may be further segmented by factors such as hours of the day, or days of the week.

Note that a "link" means a segment of a road on a map that is segmented by a predetermined rule, and may be, for example, a segment between traffic lights, or a segment between branch points (intersections). Also, links may be managed by assigning respective numbers.

When the vehicle 100 has ACC-ON, based on the positional information of the vehicle 100 received from the GPS receiver 111 and the destination location learning information, the destination estimation unit 112a extracts a predetermined number of (for example, three) destination locations that have been headed for from a departure location that corresponds to the current position of the vehicle 100, in order of frequency. Namely, the destination estimation unit 112a estimates destination locations of the vehicle 100, based on the frequency in the past with which a destination location has been headed for from the departure locations that corresponds to the current position.

The destination estimation unit 112a has the display 115 display the predetermined number of extracted (estimated) destination locations in a format that can be selected on the operation input unit 114 by an operational input, or has the audio output unit 116 output candidates of destination locations by sound. This makes it possible for the user to select a desired destination location among the predetermined number of candidates of destination locations that have been highly frequently headed for from the current position, without performing tiresome operations on the operation input unit 114.

Also, if the user does not select a destination location that has been extracted (estimated) and displayed on the display 115 as described above, then, the destination estimation unit 112a re-estimates destination locations every predetermined cycle.

Based on the map information stored in the map information storage unit 113a, the destination estimation unit 112a extracts a link (link on which the vehicle 100 is traveling) that corresponds to the current position of the vehicle received from the GPS receiver 111, and then, extracts destination locations that have been headed for, after having passed the link, based on the destination location learning information. Based on the path learning information, the destination estimation unit 112a calculates a likelihood (probability) of heading for each of the extracted destination locations after having passed the link, and extracts a predetermined number of destination locations in descending order of the likelihood (probability). Namely, the destination estimation unit 112a estimates the destination locations of the vehicle 100, based on the frequencies in the past of heading for the destination locations after having passed the link that corresponds to the current position.

As described above, the destination estimation unit 112a has the display 115 display the predetermined number of extracted (estimated) destination locations in a format that can be selected on the operation input unit 114 by an operational input, or has the audio output unit 116 output candidates of destination locations by sound. This makes it possible for the user to select a desired destination location among destination locations that are estimated to have high likelihoods of the vehicle 100 heading for, even if the user has started traveling without setting (selecting) the destination location.

Also, the ECU 112 executes a process to store travel history information of the vehicle 100 (information about traveling states of the vehicle 100 in trips) in the travel history storage unit 113*b*. For example, every predetermined cycle, the ECU 112 associates the positional information (travel position information) of the vehicle 100 received from the GPS receiver 111, with the time at the reception timing, and stores it in the travel history storage unit 113*b*. Also, the ECU 112 associates a position of the vehicle 100 at an ACC-ON timing or an ACC-OFF timing (ACC-ON position or ACC-OFF position), with the time of the ACC-ON or ACC-OFF timing, and stores it in the travel history storage unit 113*b*.

Also, at predetermined timings, the ECU 112 executes a process to transmit the travel history information of the vehicle 100 stored in the travel history storage unit 113*b* (travel position information, ACC-ON position information, and ACC-OFF position information of the vehicle 100) to the information center 200. For example, in response to an ACC-ON, the ECU 112 may transmit the travel history information of the vehicle 100 stored in the travel history storage unit 113*b*.

Note that since the information center 200 needs to determine which vehicle 100 has transmitted the vehicle history information, the ECU 112 transmits, for example, an ID specific to the in-vehicle apparatus 110 included in the travel history information. Also, in addition to the travel position information, ACC-ON position information, and ACC-OFF position information of the vehicle 100, the travel history information may include, for example, the vehicle speed information, and other information about a traveling state of the vehicle 100. Also, the ACC-ON position information and ACC-OFF position information are an example of information representing a parking position of the vehicle 100, and may be replaced with other information (for example, output information of a passenger sensor that detects whether a driver is seated).

Also, the ECU 112 executes a process to receive the learning data (the destination location learning information and the path learning information) distributed from the information center 200 at predetermined timings, and to update the learning data in the learning data storage unit 113*c*.

The storage unit 113 is a non-volatile storage unit, and includes the map information storage unit 113*a*, the travel history storage unit 113*b*, and the learning data storage unit 113*c*.

The map information storage unit 113*a* stores map information and the like.

Note that the map information may include positional information of a link, the road type information of a link (distinction among a freeway, a public highway, a local street, and the like), positional information of a node (a contact point between links), node type information, and information about a connection relationship between nodes and links.

The travel history storage unit 113*b* stores the travel history information of the vehicle 100 (information about traveling states in trips of the vehicle 100).

Note that the travel history information stored in the travel history storage unit 113*b* may be deleted every time transmission of the travel history information by the information center 200 is completed by the ECU 112.

The learning data storage unit 113*c* stores the learning data (the destination location learning information and the path learning information) distributed from the information center 200.

Note that at least one of the map information storage unit 113*a*, the travel history storage unit 113*b*, and the learning data storage unit 113*c*, may be included in a storage unit different from the storage unit 113.

The operation input unit 114 is an operational unit to operate the in-vehicle apparatus 110 by the user of the vehicle 100, and may be, for example, mechanical buttons, a joy stick, a touch pad (including a touch panel), or the like.

The display 115 is a display unit to display predetermined images based on a command from the ECU 112. Also, the display 115 is an output unit to output predetermined images that represent contents of an operational input on the operation input unit 114, or a result of a control process by the ECU 112.

Note that an image (a screen) displayed on the display 115 may be generated by a processor in the display 115, based on a command from the ECU 112, or may be generated in the ECU 112 and transmitted to the display 115.

The audio output unit 116 is an output unit to output information by sound based on a command from the ECU 112, and may be, for example, a loudspeaker or the like that is disposed in the passenger compartment of the vehicle 100.

Based on the travel history information periodically transmitted from the vehicles 100, the information center 200 has a function to generate, for each of the vehicles 100, the learning data (the destination location learning information and the path learning information) about destination locations that the vehicles 100 have headed for, travel paths, and the like, and to distribute the learning data to the respective vehicles 100. The information center 200 is configured to include a management unit 210, a travel history accumulation unit 220, a learning process unit 230, a learning result storage unit 240, a POI (Point Of Interest) DB 250, a distribution data generation unit 260, and a file distribution server 270.

The management unit 210 includes a function to manage (control in a unified way) various processes in the information center 200, and may be configured with a computer that includes, for example, a CPU, a RAM, a ROM, and I/Os.

The travel history accumulation unit 220 is a storage unit to accumulate the travel history information (travel position information, ACC-ON position information, ACC-OFF position information of the vehicles 100) transmitted from the vehicles 100 to the information center 200 at predetermined timings.

Based on the travel history information of the vehicles 100 accumulated in the travel history accumulation unit 220, the learning process unit 230 generates the learning data (the destination location learning information and the path learning information) about destination locations that the vehicles 100 have headed for, travel paths, and the like.

Note that the learning process unit 230 may execute a process to generate the learning data at predetermined cycles (for example, every day at 2 AM). Also, the learning process unit 230 may execute a process to generate the learning data at predetermined timings after the travel history accumulation unit 220 has the travel history information of the vehicle 100 newly stored.

A process to be executed by the learning process unit 230 to generate the learning data may be divided into, for example, five processes: (1) a trip data generation process, (2) a normalization process, (3) a destination location (departure location) extraction process, (4) a POI information assignment process, and (5) a learning data generation process.

(1) Trip Data Generation Process

The learning process unit 230 processes the travel history information accumulated in the travel history accumulation unit 220, and generates data (trip data) having been associated with trips. For example, the learning process unit 230 generates trip data by having each of the trips associated with corresponding travel position information, ACC-ON position information, and ACC-OFF position information. Also, the learning process unit 230 converts the travel position information in the trip data into link information corresponding to the travel path (for example, a sequence of link numbers).

(2) Normalization Process

The learning process unit 230 executes a process to normalize the trip data in accordance with a predetermined rule. For example, the learning process unit 230 excludes trip data that lacks ACC-ON position information or ACC-OFF position information for some reason, trip data that corresponds to a short-time parking in a garage, and the like, from the trip data to be used for generating the learning data. Also, the learning process unit 230 may put two consecutive pieces of trip data together as one set of trip data, such as ACC-OFF position information and ACC-ON position information that correspond to a short-time stop (for example, shopping at a convenience store on the way to a destination location).

(3) Destination Location (Departure Location) Extraction Process

The learning process unit 230 executes a process to extract an ACC-OFF position (or an ACC-ON position) for each of the normalized trip data sets, namely, a destination location of the vehicle 100 from the parking position of the vehicle 100. The process is a process executed by the destination location extraction apparatus 10 that is implemented as a function of the navigation system 1, and in the following, is referred to as a process executed by the destination location extraction apparatus 10.

Note that a destination location to be extracted is, to put it another way, a departure location of a next trip. Therefore, the destination location extraction apparatus 10 in the present embodiment extracts a departure location and a destination location of the vehicle 100. In the following description, for the sake of convenience, a process will be described that extracts a destination location.

Here, using FIG. 2 and FIG. 3, a process will be described that extracts a destination location of the vehicle 100.

Figure 2:
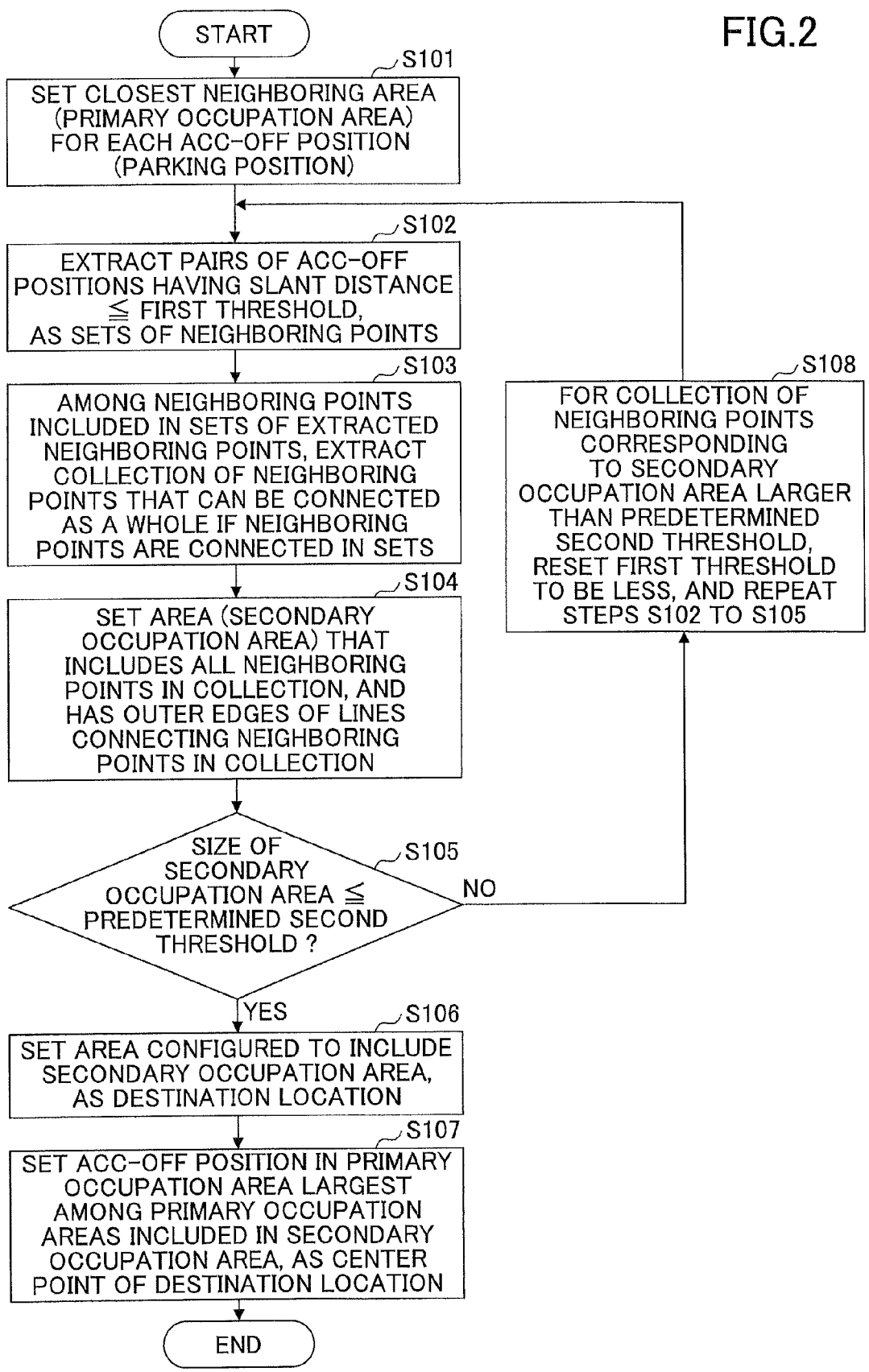
FIG. 2 is a flowchart illustrating an example of an extraction process of a destination location of a vehicle by a destination location extraction apparatus (learning process unit)

FIG. 2 is a flowchart illustrating an example of a process to extract a destination location of the vehicle 100 by the destination location extraction apparatus 10 (learning process unit 230). FIG. 3 is a diagram illustrating an example of an extraction method of a destination location of the vehicle 100 by the destination location extraction apparatus 10 (learning process unit 230). Specifically, FIG. 3 is a diagram illustrating a method of extracting a destination location DA from ACC-OFF positions P1 to P5 that are positioned within a comparatively short distance.

Figure 3:
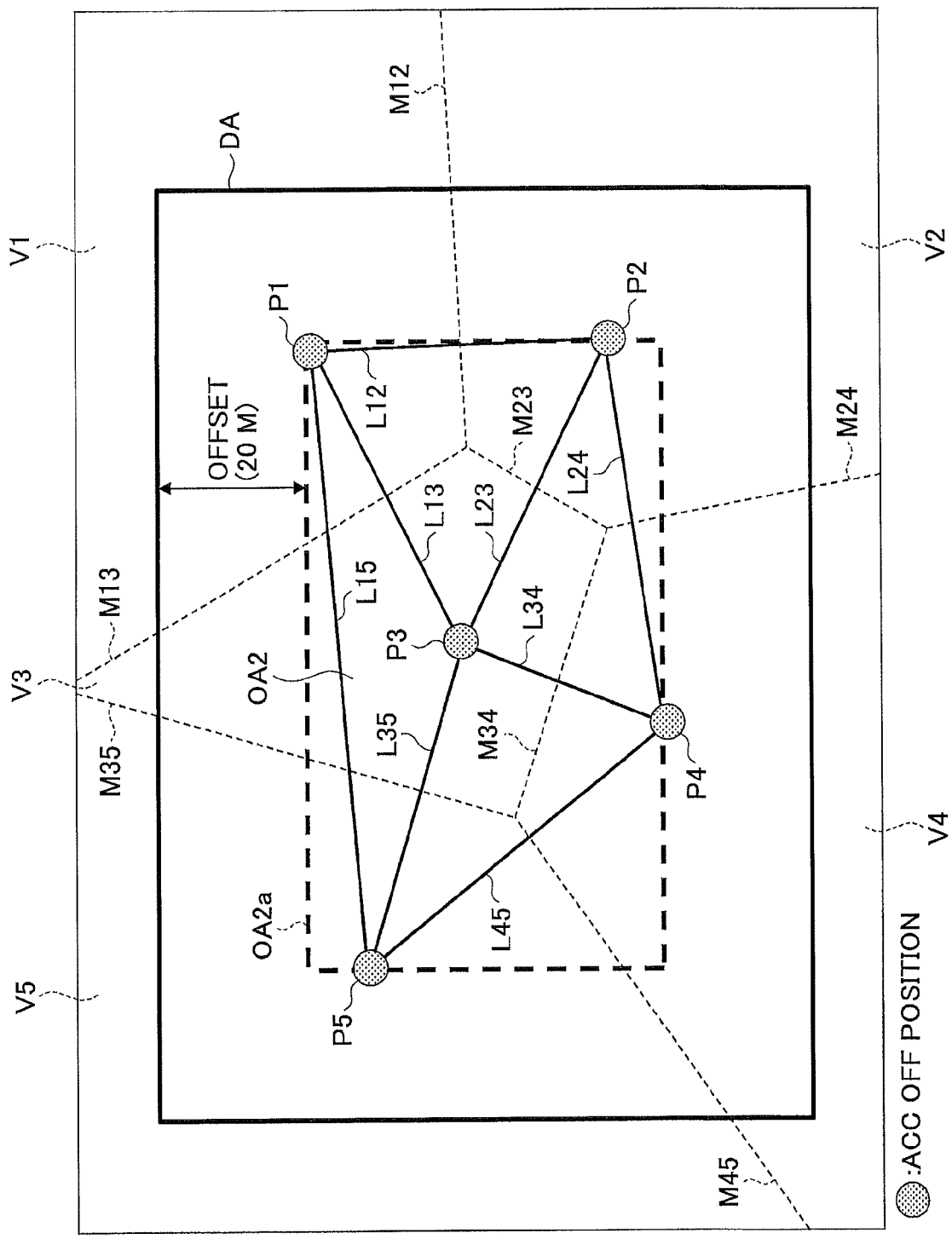
FIG. 3 is a diagram illustrating an example of an extraction method of a destination location of a vehicle by a destination location extraction apparatus (learning process unit)

Note that, in FIG. 3, the upward direction is north, the downward direction is south, the leftward direction is west, and the rightward direction is east.

Referring to FIG. 2, at Step S101, the process sets a closest neighboring area (referred to as a "primary occupation area") for each of the ACC-OFF positions (namely, the parking positions of the vehicle 100). A closest neighboring area means an area that is constituted with positions (points) whose distances from one of the ACC-OFF positions are shorter than distances from the other ACC-OFF positions.

Note that a "distance from an ACC-OFF position" may be a slant distance, or may be a distance taking upgrades and downgrades of the land into account.

For example, assuming the slant distance as the "distance from an ACC-OFF position", and focusing on a relationship between two ACC-OFF positions, the perpendicular bisector of a line connecting the two ACC-OFF positions is the boundary line of the closest neighboring areas of the respective ACC-OFF positions. Therefore, as illustrated in FIG. 3, the closest neighboring areas V1 to V5 of the ACC-OFF positions P1 to P5, respectively, have boundary lines M12, M13, M23, M24, M34, M35, and M45, which are perpendicular bisectors of lines L12, L13, L23, L24, L34, L35, and L45 that connect two of the ACC-OFF positions, respectively.

At Step S102, the process extracts one or more pairs of the ACC-OFF positions where a pair of the ACC-OFF positions has the slant distance less than or equal to a first threshold (for example, 50 m), and treats each of the pairs as a set of candidate points.

In the example in FIG. 3, the slant distances are less than or equal to the first threshold (50 m) for pairs of the ACC-OFF position P1 and the ACC-OFF position P2; the ACC-OFF position P1 and the ACC-OFF position P3; the ACC-OFF position P2 and the ACC-OFF position P3; the ACC-OFF position P3 and the ACC-OFF position P4; and the ACC-OFF position P3 and the ACC-OFF position P5. Then, those pairs are extracted and treated as sets of neighboring points, namely, the ACC-OFF position P1 and the ACC-OFF position P2; the ACC-OFF position P1 and the ACC-OFF position P3; the ACC-OFF position P2 and the ACC-OFF position P3; the ACC-OFF position P3 and the ACC-OFF position P4; and the ACC-OFF position P3 and the ACC-OFF position P5.

At Step S103, among the neighboring points included in the sets of extracted neighboring points, the process extracts a collection of neighboring points that would be connected as a whole if the neighboring points were connected in the respective sets.

In the example in FIG. 3, the pairs of neighboring points the ACC-OFF position P1 and the ACC-OFF position P2, the ACC-OFF position P1 and the ACC-OFF position P3, the ACC-OFF position P2 and the ACC-OFF position P3, the ACC-OFF position P3 and the ACC-OFF position P4, and the ACC-OFF position P3 and the ACC-OFF position P5, are connected by the connection lines L12, L13, L23, L34, and L35, respectively. Then, via the ACC-OFF position P3, the neighboring points of the ACC-OFF positions P1 to P5 can be connected as a whole. Therefore, the ACC-OFF positions P1 to P5 are extracted as a collection of the neighboring points that can be connected as a whole.

At Step S104, for each of the collections extracted at Step S103, the process sets an area (referred to as a "secondary occupation area") that includes all neighboring points in the collection, and has outer edges constituted with lines that connect the neighboring points in the collection.

In the example in FIG. 3, a secondary occupation area OA2 is set that includes the ACC-OFF positions P1 to P5 extracted as the collection of the neighboring points that can be connected as a whole, and has the connection lines L12, L24, L45, L15 as the outer edges.

At Step S105, the process determines whether the size of each of the secondary occupation areas set at Step S104 is less than or equal to a predetermined second threshold. For example, the size of a secondary occupation area may be determined whether the lengths in the north-south direction and the east-west direction are less than or equal to a predetermined second threshold (for example, 500 m). If the sizes of all set secondary occupation areas are less than or equal to the predetermined second threshold, the process goes forward to Step S106; or if the size of a secondary occupation area is not less than or equal to the predetermined second threshold (greater than predetermined second threshold), the process goes to Step S108.

At Step S106, the process sets an area configured to include the secondary occupation areas as a destination location. Namely, the process sets an area configured to include the collection of the neighboring points (ACC-OFF positions) that can be connected as a whole as described above, as a destination location (area).

In the example in FIG. 3, a rectangular area having two edges in the north-south direction and in the east-west direction, respectively, is set as a destination location DA. Specifically, a rectangular area OA2a is set to include the secondary occupation area OA2 that has the respective lengths in the north-south direction and the east-west direction, and then, the destination location DA is set by offsetting the rectangular area OA2a outward by a predetermined amount (20 m in this example).

At Step S107, for each of the destination locations having set, the process sets the ACC-OFF position in the primary occupation area having the largest area among the primary occupation areas included in the secondary occupation area, as the center point (representative position) of the destination location.

In the example in FIG. 3, the ACC-OFF position P3 in the primary occupation area V3 having the largest area among the primary occupation areas V1 to V5 included in the secondary occupation area OA2 is set as the center point (representative position) of the destination location DA.

Note that, in this example, although the primary occupation areas are set (Step S101) before setting the destination location, primary occupation areas may be set after having set (extracted) a destination location (between Steps S106 and S107), by taking neighboring points (ACC-OFF positions) included in the secondary occupation area into consideration.

On the other hand, at Step S108, for a collection of neighboring points corresponding to a secondary occupation area larger than the predetermined second threshold, the process resets the first threshold to be less (for example, change from 50 m to 20 m), and repeats Steps S102 to S105 until the determination condition at Step S105 is satisfied.

In this way, the destination location extraction apparatus 10 can aggregate a group of parking positions (ACC-OFF positions) that are comparatively close to each other, to extract a single destination location. Namely, the destination location extraction apparatus 10 can extract parking positions as the same destination location, even if the vehicle parks at a parking position different in the same destination location, or the vehicle is considered to park at a different parking position due to a detection error of the vehicle position by using the GPS or the like.

Also, if the area (secondary occupation area) that aggregates the parking positions is comparatively greater (greater than a predetermined second threshold), the destination location extraction apparatus 10 can change the first threshold to a smaller value, to extract a destination location again. This can prevent multiple destination locations from being extracted as a single destination location, for example, if multiple facilities corresponding to destination locations of the vehicle 100 are adjacent to each other, and parking positions not corresponding to the same destination location are adjacent to each other.

Note that, in the example in FIG. 2, although the process determines whether the size of the secondary occupation area is less than or equal to the predetermined second threshold (Step S105), the process may determine whether the size of a destination location is less than or equal to a predetermined second threshold (having a different numerical value from the above second threshold) after having the destination location set (namely, after a step corresponding to Step S106). Namely, it is sufficient to determine that an extracted destination location is not too great (the size of the destination location is less than or equal to a predetermined value).

(4) POI Information Assignment Process

The learning process unit 230 executes a process to assign POI information to an extracted destination location. Specifically, the learning process unit 230 assigns POI information about a facility in the area of the destination location, and the assigned POI information is extracted from the POI DB 250.

(5) Learning Data Generation Process

Based on the destination location (departure location) extracted at (3) described above, the learning process unit 230 executes a process to generate the destination location learning information and the path learning information described above. The learning process unit 230 stores the generated destination location learning information and the path learning information in the destination learning DB 241 and the path learning DB 242, respectively, which will be described later.

The learning result storage unit 240 is a storage unit that stores learning data about destination locations, travel paths and the like which the vehicle 100 heads for, based on travel history of the vehicle 100 generated by the learning process unit 230, and includes the destination learning DB 241 and the path learning DB 242.

The destination learning DB 241 is a database that stores the destination location learning information generated by the learning process unit 230.

The path learning DB 242 is a database that stores the path learning information generated by the learning process unit 230.

The POI DB 250 is a database that stores POI information (information about facilities (advertisement information, bargain information, and the like), information about sightseeing spots, and the like). Under management of the management unit 210, the POI DB 250 periodically (for example, every day at 2 AM) obtains the latest POI information from external content providers or the like via the Internet, and updates the POI information in the database.

Under management of the management unit 210, the distribution data generation unit 260 executes a process to generate data to be distributed to the vehicles 100 from the information center 200. For example, based on the destination learning DB 241 and the path learning DB 242, the distribution data generation unit 260 generates learning data (the destination location learning information and the path learning information) to be distributed to the vehicles 100 from the file distribution server 270. Also, the distribution data generation unit 260 may generate POI information based on the POI DB 250 (for example, advertisement information, bargain information, and the like of facilities in an area where the vehicle 100 is traveling) to be distributed from the file distribution server 270.

Under management of the management unit 210, the file distribution server 270 distributes information to the vehicle 100. For example, the file distribution server 270 distributes the learning data (the destination location learning information and the path learning information) to the vehicles 100 at predetermined timings. Also, the file distribution server 270 may distribute the POI information to the vehicles 100 when appropriate.

Next, operations of the destination location extraction apparatus 10 will be described according to the present embodiment.

Figure 4A:
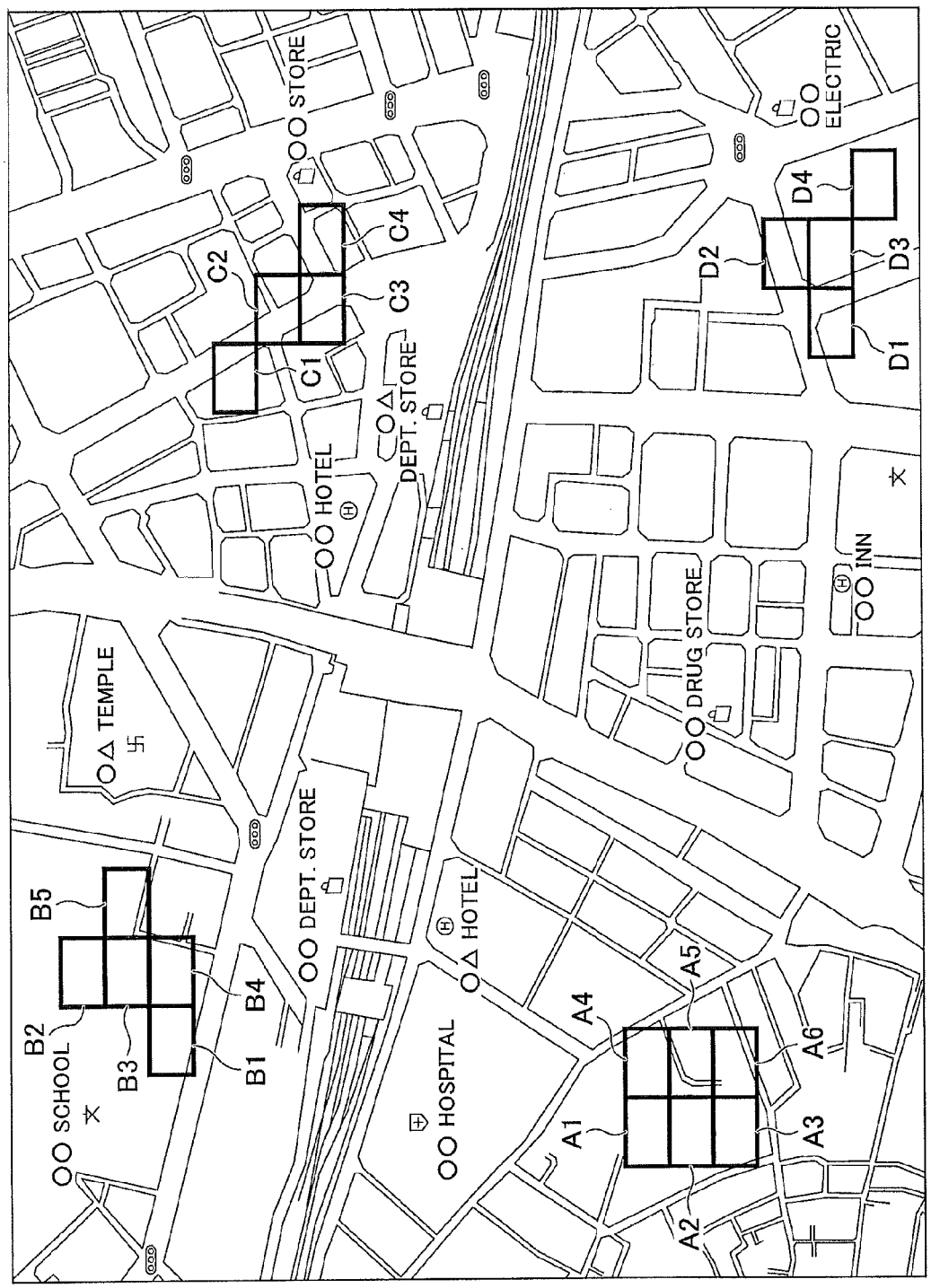
FIGS. 4A-4B are diagrams illustrating operations of a destination location extraction apparatus (learning process unit).
Figure 4B:
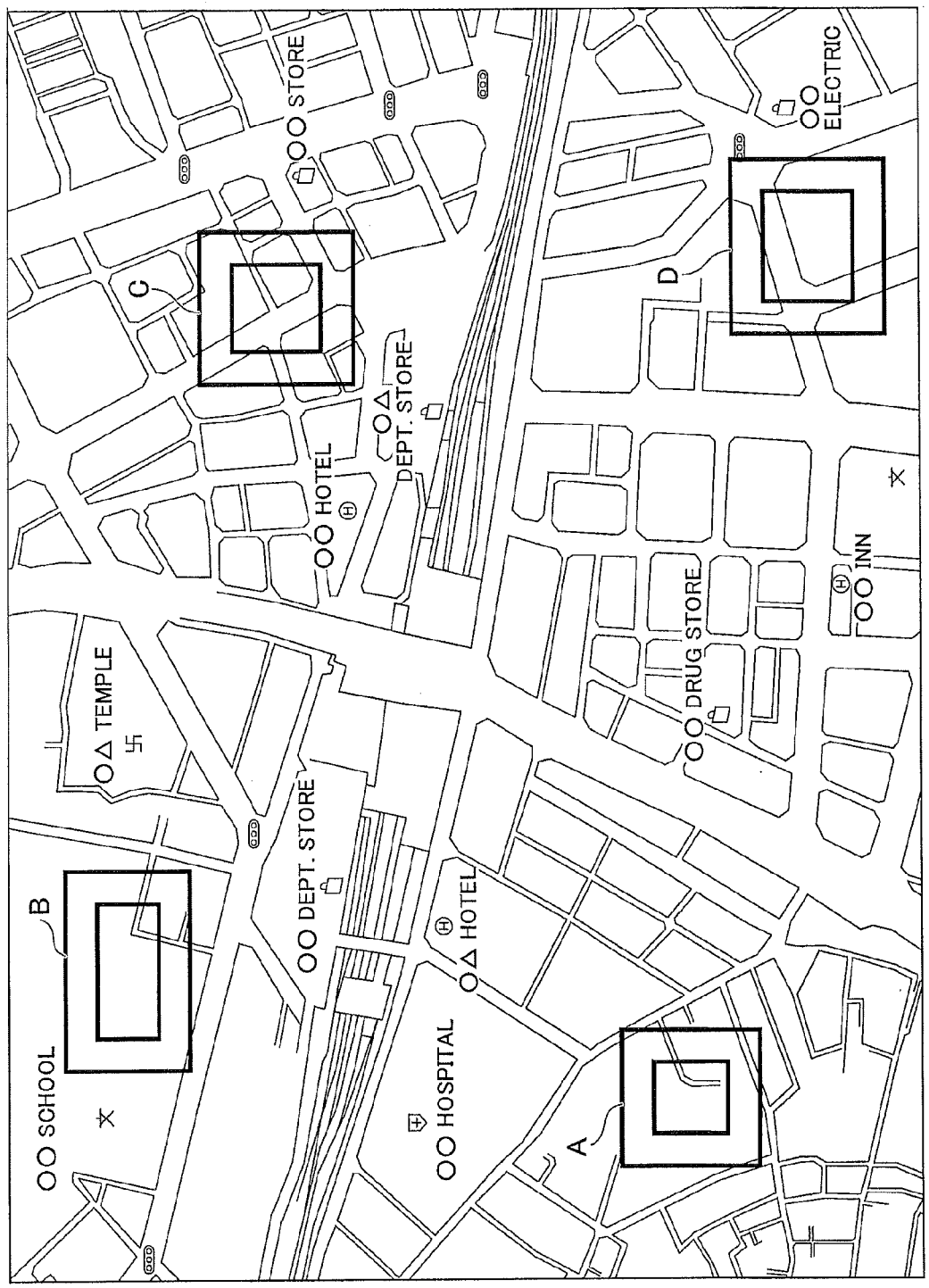

FIGS. 4A-4B are diagrams illustrating operations of a destination location extraction apparatus (learning process unit). FIG. 4A is a diagram illustrating an example of a case where parking positions are extracted as destination locations of the vehicle 100 as they are, and the extracted destination locations are designated on a map. FIG. 4B is a diagram illustrating an example of a case where parking positions are aggregated by the destination location extraction apparatus 10 in the present embodiment to be extracted as a destination location (area), and the extracted destination locations are designated on a map, similarly to FIG. 4A.

Note that FIGS. 4A and 4B include the destination locations extracted based on the same parking position (ACC-OFF position) information, and have the same range of the map displayed. Also, in FIG. 4A, predetermined rectangular areas are designated as destination locations that include parking positions, respectively. Also, inner rectangles at the destination locations A to D displayed in FIG. 4B correspond to the rectangular area OA2a in FIG. 3.

Referring to FIG. 4A, simply extracting parking positions as destination locations of the vehicle 100 as they are, results in multiple extracted destination locations, such as destination locations A1 to A6, destination locations B1 to B5, destination locations C1 to C4, and destination locations D1 to D4, if parking positions are comparatively close to each other.

On the other hand, referring to FIG. 4B, the destination location extraction apparatus 10 in the present embodiment aggregates parking positions to extract a destination location (area). Therefore, the destination locations A1 to A6, the destination locations B1 to B5, the destination locations C1 to C4, and the destination locations D1 to D4 in FIG. 4A are extracted as the same destination locations A, B, C, and D, respectively. Namely, the destination location extraction apparatus 10 can extract parking positions as the same destination location, even if the vehicle parks at one of different parking positions in the same destination location, or the vehicle is considered to park at one of the different parking positions due to a detection error of the vehicle position by using the GPS or the like.

Also, if different parking positions that correspond to the same destination location are extracted as different destination locations as in FIG. 4A, there will be a reduction in the precision of the learning data (the destination location learning information and the path learning information) that is generated by the learning process unit 230. Namely, trips of the vehicle 100 having the same departure location and destination location may be recognized as trips having at least different departure locations or destination locations, with which generated learning data may not reflect the reality of travel of the vehicle 100. In addition, if the in-vehicle apparatus 110 estimates a destination location based on the learning data, it may extract an unrealistic destination location, and may not be capable of offering appropriate drive support for the user (driver) of the vehicle 100. For example, if trips of the vehicle 100 having the same departure location and destination location are recognized as the trips having different destination locations, the frequency of heading for the destination location is reduced, and another destination location having a frequency not-so-high in reality may be extracted by the in-vehicle apparatus 110 (the ECU 112).

On the other hand, as in FIG. 4B, the destination location extraction apparatus 10 in the present embodiment can extract different parking positions for the same departure location and destination location as the same destination location, and hence, can improve precision of learning data that is generated by the learning process unit 230. Then, based on the learning data, the in-vehicle apparatus 110 can extract a destination location that matches with real traveling of the vehicle 100, and the in-vehicle apparatus 110 (the ECU 112) can appropriately offer drive support for the user (driver) of the vehicle 100.

The embodiments of the present invention have been described in detail. Note that the present invention is not limited to the above specific embodiments, but various changes, substitutions, and alterations could be made without departing from the spirit and scope of the invention. For example, although the destination location extraction apparatus 10 in the present embodiment is implemented in the information center 200 of the navigation system 1, it may be built in the vehicle 100. Namely, if adopting a configuration to generate learning data in the vehicle 100 based on travel history of the vehicle 100 (namely, if an in-vehicle navigation apparatus does not assume information distribution from the information center 200), the destination location extraction apparatus 10 is built in the vehicle 100.

Also, although a destination location (departure location) extracted by the destination location extraction apparatus 10 in the present embodiment is used in the in-vehicle apparatus 110 for estimating a destination location that the vehicle 100 heads for, the use is not limited to that. For example, types of facilities in the destination location extracted by the destination location extraction apparatus 10 in the present embodiment may be used for estimating preference of the user of the vehicle 100, and depending on the estimated preference, types of POI information to be distributed from the information center 200 may be determined (changed).

The present application is based on and claims the benefit of priority of Japanese Priority Application No. 2014-156944, filed on Jul. 31, 2014, the entire contents of which are hereby incorporated by reference.

The invention claimed is:

1. A departure/destination location extraction apparatus, comprising:
   a memory configured to store a travel history of a vehicle, including a plurality of parking positions of the vehicle; and
   one or more processors configured
      to extract, among the parking positions stored in the memory, one or more pairs of the parking positions where a distance between the parking positions in each of the pairs of the parking positions is less than or equal to a predetermined first threshold, each of the pairs being treated as a set of candidate points,
      to extract an area including the candidate points that would be connected as a whole if the parking positions in each of the sets were connected with each other, as at least one of a departure location and a destination location, and
      to output for display the area including the candidate points as the at least one of a departure location and a destination location.

2. The departure/destination location extraction apparatus, as claimed in claim 1, wherein
   the one or more processors change the first threshold to a smaller value when the size of the area is greater than or equal to a predetermined value, and execute the extraction again for at least one of the departure location and the destination location.

3. The departure/destination location extraction apparatus, as claimed in claim 1, wherein the one or more processors extract a closest neighboring area at least for each of the parking positions included in the candidate points that would be connected with each other as a whole, where the closest neighboring area is constituted with positional points that are closer to the parking position than to the other parking positions, and set the parking position having the largest closest neighboring area in an area having outer edges of lines connecting the parking positions included in the candidate points that would be connected with each other as a whole, as a representative position of at least one of the departure location and the destination location.

4. A departure/destination location extraction method, the method being executed by a computer, the method comprising:

a travel history accumulation step storing in a memory a travel history of a vehicle, including a plurality of parking positions of the vehicle; and a position extraction step extracting via one or more processors, among the parking positions stored in the travel history accumulation step, one or more pairs of the parking positions where a distance between the parking positions in each of the pairs of the parking positions is less than or equal to a predetermined first threshold, each of the pairs being treated as a set of candidate points, extracting, via the one or more processors, an area including the candidate points that would be connected as a whole if the parking positions in each of the sets were connected with each other, as at least one of a departure location and a destination location, and outputting, via the one or more processors, for display the area including the candidate points at the least one of a departure location and a destination location.

5. An information center having the departure/destination location extraction apparatus of claim 1.

6. An in-vehicle navigation device having the departure/destination location extraction apparatus of claim 1.

\* \* \* \* \*